US012544802B2

(12) United States Patent
Timperio et al.

(10) Patent No.: US 12,544,802 B2
(45) Date of Patent: Feb. 10, 2026

(54) CONVEYOR WITH SELECTIVE WIDTH REJECTION SYSTEM

(71) Applicant: JBT Marel Corporation, Chicago, IL (US)

(72) Inventors: Richard Timperio, Catskill, NY (US); Amer M. Butt, Williamsville, NY (US); Peter Osvald DiCapua, Highland, NY (US)

(73) Assignee: JBT Marel Corporation, Chicago, IL (US)

( * ) Notice: Subject to any disclaimer, the term of this patent is extended or adjusted under 35 U.S.C. 154(b) by 0 days.

(21) Appl. No.: 17/753,572

(22) PCT Filed: Aug. 24, 2020

(86) PCT No.: PCT/US2020/047589
§ 371 (c)(1),
(2) Date: Mar. 8, 2022

(87) PCT Pub. No.: WO2021/050252
PCT Pub. Date: Mar. 18, 2021

(65) Prior Publication Data
US 2022/0280981 A1    Sep. 8, 2022

Related U.S. Application Data

(60) Provisional application No. 62/899,796, filed on Sep. 13, 2019.

(51) Int. Cl.
*B07C 5/36* (2006.01)
*B07C 5/10* (2006.01)
*B07C 5/342* (2006.01)

(52) U.S. Cl.
CPC .............. *B07C 5/362* (2013.01); *B07C 5/10* (2013.01); *B07C 5/3422* (2013.01); *B07C 2501/0081* (2013.01)

(58) Field of Classification Search
CPC ....... B07C 5/362; B07C 5/10; B65G 47/8853; B65G 47/967
(Continued)

(56) References Cited

U.S. PATENT DOCUMENTS

| 3,837,485 A | 9/1974 | Otten et al. |
| 4,938,336 A * | 7/1990 | Aquino ................ B65G 47/647 198/444 |
| 4,940,536 A | 7/1990 | Cowlin et al. |
| 6,708,813 B2 * | 3/2004 | Takahashi ............ B65G 47/647 198/813 |
| 8,833,546 B2 * | 9/2014 | Tsai ................... B65H 31/3009 198/594 |

(Continued)

FOREIGN PATENT DOCUMENTS

| CN | 201233376 Y | 5/2009 |
| CN | 102410828 A | 4/2012 |

(Continued)

OTHER PUBLICATIONS

International Search Report and Written Opinion mailed Feb. 1, 2021, issued in corresponding International Patent Application No. PCT/US2020/047589, filed Aug. 24, 2020, 21 pages.

(Continued)

*Primary Examiner* — Molly K Devine
(74) *Attorney, Agent, or Firm* — Christensen O'Connor Johnson Kindness PLLC (57) ABSTRACT

Food products (22) being transported on a conveyor (24) are scanned to ascertain if designated desired physical parameters are met. If so, the food products (22) are allowed to continue along a processing path. If not, the food products are diverted from the processing path by a diverter system (30) consisting of the plurality of individually operated diverter units positioned across the width of the conveyor. The diverter units (32) are controlled by a control system (28) so that only the diverter units in alignment with work products (22) to be diverted are actuated thereby to remove the work product from the processing path (25).

13 Claims, 10 Drawing Sheets

(58) Field of Classification Search
USPC .................. 209/577, 580, 620; 198/364, 812
See application file for complete search history.

(56) References Cited

U.S. PATENT DOCUMENTS

| | | | |
|---|---|---|---|
| 2010/0236994 A1* | 9/2010 | Hoffman | B07C 5/362 209/552 |
| 2014/0220193 A1* | 8/2014 | Hocker | G01K 13/12 374/141 |
| 2014/0220197 A1 | 8/2014 | Hocker et al. | |
| 2018/0001353 A1 | 1/2018 | Stockard et al. | |
| 2018/0029246 A1 | 2/2018 | Blaine et al. | |

FOREIGN PATENT DOCUMENTS

| | | |
|---|---|---|
| CN | 102821876 A | 12/2012 |
| CN | 103157607 A | 6/2013 |
| CN | 104470837 A | 3/2015 |
| CN | 107537781 A | 1/2018 |
| CN | 107902443 A | 4/2018 |
| CN | 108883438 A | 11/2018 |
| CN | 109159971 A | 1/2019 |
| JP | 2018086618 A | 6/2018 |
| WO | 2014100829 A1 | 6/2014 |
| WO | 2019058262 A1 | 9/2018 |

OTHER PUBLICATIONS

First Office Action and Search Report mailed Jan. 23, 2024, issued in corresponding Chinese Application No. 202080063602.5, filed Aug. 24, 2020, 17 pages.

Office Action and Search Report mailed Jul. 26, 2024, issued in corresponding Chinese Application No. 202080063602.5, filed Aug. 24, 2020, 15 pages.

* cited by examiner

CONVEYOR WITH SELECTIVE WIDTH REJECTION SYSTEM

BACKGROUND

Work products, including food products, in a processing path must often be sorted based on one or more of a myriad of different physical parameters including, for example, size, shape, thickness, weight, texture, color, presence of a contaminant, etc. Current sorting or rejection systems have a fixed aperture that are the full width of a conveyor belt or conveyor belt lane. As processing lines increase in width, a fixed aperture rejection system can be inefficient since as disqualified product is being removed from the production path, qualified or desirable product may also be inadvertently diverted.

The system and method of the present disclosure seeks to address the foregoing issue by providing a diversion or rejection system capable of analyzing the location and size of the work products to be diverted or discarded and then creating a rejection aperture width to match the location of the rejected work product across the width of the conveyor as well as the size of the work product to be rejected, with the remaining width of the conveyor operating as normal to convey acceptable work product along the processing path.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a system is provided for sorting variable size work products, comprising: (a) a processor enabled control system for controlling the operation of the sorting system; (b) a conveyor controlled by the control system for transporting variable size work products along a conveyance path, the work products loaded randomly across the width of the conveyor, the conveyor having an output end; (c) a scanner controlled by the control system for scanning the work products being carried on the conveyor, the scanner generating digital data pertaining to the location, size and other physical parameters of the work product and sending such data to the control system; (d) a diverter system controlled by the control system, the diverter system comprising an array of diverter segments arranged across the width of the conveyor, the width of each diverter segment being a fraction of the width of the conveyor; and (e) wherein the control system based on the data from the scanning system determines what work products are to continue along the conveyance path and what work products are to be diverted from the conveyance path, the control system ascertains the location and size of the work products to be diverted from the conveyance path and operates one or more of the diverter segments corresponding to the location across the width of the conveyor belt of the work product to be diverted and the size of the work product to be diverted, to cause the work product to be diverted from the conveyance path.

In accordance with any of the embodiments described herein, wherein work products to be diverted from the conveyance path have been determined by the control system to not meet one or more required physical parameters for the work products.

In accordance with an embodiment of the present disclosure, a diverter system is provided for diverting work products from a processing path that do not meet one or more desired physical parameters for the work products, the work products being carried on a conveyance system past a scanning station to generate digital data pertaining to physical parameters of the work product, the diverter system comprising: a plurality of diverter segments arranged to cross the width of the conveyor, the diverter segments having a width that is a fraction of the width of the conveyor; and a processor enabled control system for controlling the operation of the diverter system, the control system using data from the scanner to determine whether work products being carried by the conveyor meet one or more required physical parameters for the work products in order to continue along the processing path or do not meet the required one or more physical parameters for the work products so as to constitute reject work products, the control system ascertains the location and size of the reject work products and operates one or more of the diverter segments corresponding to the location of the reject work products across the width of the conveyor and the size of the reject work products to cause the reject work product to be diverted from the processing path.

In accordance with any of the embodiments described herein, wherein the physical parameters of the work products include one or more parameters selected from the group consisting of the work product: size; shape; length; width; aspect ratio (length to width); outer contour; outer perimeter; outer perimeter configuration; outer perimeter size; outer perimeter shape; thickness; flatness; the extent of depressions or concavities; depression/concavity size; depression/concavity depth; texture; smoothness; density; color; composition; firmness; presence of contaminants; presence of foreign objects; uniformity.

In accordance with any of the embodiments described herein, wherein the work product includes food, which is also scanned for the presence of one or more of: fat; bones; cartilage; discoloration; bruising; blemishes; spoilage; rot.

In accordance with any of the embodiments described herein, wherein the width of the diverter segments are a fraction of the width of the conveyor, such fraction selected from the group including one half; one third; one fourth; one fifth; one sixth; one seventh; one eighth; one ninth; one tenth; one eleventh; one twelfth; one thirteenth; one fourteenth; one fifteenth; one sixteenth; one seventeenth; one eighteenth; one nineteenth; one twentieth; one twenty first; one twenty second; one twenty third; one twenty fourth; and one twenty fifth of the width of the conveyor.

In accordance with any of the embodiments described herein, wherein the width of the diverters are from 50% to 4% of the width of the conveyor.

In accordance with any of the embodiments described herein, wherein the conveyor defines a conveying surface on which the work products are transported, and the diverter segments are positioned to receive work products from the conveying surface.

In accordance with any of the embodiments described herein, wherein the diverter segments are nominally coplanar with or below the conveying surface of the conveyor and are controlled by the control system to move out of the plane of the conveying surface of the conveyor.

In accordance with any of the embodiments described herein, wherein the control system individually controls the diverter segments to pivot upward or downward relative to the plane of the conveying surface.

In accordance with any of the embodiments described herein, wherein the diverter segments extend longitudinally with respect to the length of the conveyor and are retractable to create a gap between the retracted and extended diverter segments.

In accordance with any of the embodiments described herein, wherein each of the diverter segments is individually controllable by the control system to retract and extend based on the size of the work product being diverted.

In accordance with any of the embodiments described herein, wherein the conveyor is divided into individual lanes into which the work products are loaded on the conveyor.

In accordance with any of the embodiments described herein, wherein a plurality of diverters are positioned across the widths of the conveyor lanes.

In accordance with any of the embodiments described herein, wherein the control system determines the lane in which a work product to be diverted is located and controls the operation of the diverter segments of such conveyor lane to divert the work products from the conveyor.

In accordance with any of the embodiments described herein, wherein the width of the diverter segments corresponds to the expected minimum width of the work product to be diverted by the sorting system.

In accordance with any of the embodiments described herein, wherein the width of the diverter segments corresponds to the narrowest $10^{th}$ percentile of the widths of the work products to be diverted.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, references to "food," "food products," "food pieces," and "food items," are used interchangeably and are meant to include all manner of foods. Such foods may include meat, fish, shellfish, poultry, fruits, vegetables, nuts, or other types of foods. Also, the present systems and methods are directed to raw food products, as well as partially and/or fully processed or cooked food products.

Further, the system, apparatus and methods disclosed in the present application and defined in the present claims, though specifically applicable to food products or food items, may also be used outside of the food area. Accordingly, the present application and claims reference "work products" and "work products," which terms are synonymous with each other. It is to be understood that references to work products and work products also include food, food products, food pieces, and food items.

The system and method of the present disclosure include the scanning of work products, including food items, to ascertain physical parameters of the work product comprising the size and/or shape and other physical parameters as well as the physical condition of the work product. Such size and/or shape parameters may include, for example, the length, width, aspect ratio (length to width ratio), thickness, thickness profile, contour, flatness, the extent of depressions or concavities, depression/concavity size, depression/concavity depth, outer contour, outer perimeter, outer perimeter configuration, outer perimeter size, outer perimeter shape, volume, weight and/or density of the work product.

With respect to the physical parameters such as length, width, length/width aspect ratio, thickness, volume, height, density of the work products, including food items, such physical parameters may include the maximum, minimum, average, mean, and/or medium values of such parameters.

With respect to the thickness profile of the work product, such profile can be along the length of the work product, across the width of the work product, as well as both across/along the width and length of the work product.

As noted above, a further parameter of the work product that may be ascertained, measured, analyzed, etc., is the contour of the work product. The term contour may refer to the outline, shape, and/or form of the work product, whether at the base or bottom of the work product or at any height along the thickness of the work product. The parameter term "outer contour" may refer to the outline, shape, form, etc., of the work product along its outermost boundary or edge.

In a further aspect, the term contour may refer to the shape or form of the workpiece across and/or along the top surface and/or the bottom surface of the workpiece. Physical parameters related to this concept of contour include a flatness of the workpiece, the smoothness of the workpiece, the extent of depressions or concavities in the workpiece, the location and size of the depressions or concavities in the top and bottom surfaces, as well as the depth of the depressions or concavities. In some workpieces, it is important that the top and bottom surfaces be as flat as possible or as smooth as possible without significant depressions or concavities.

The parameter referred to as the "perimeter" of the work product refers to the boundary or distance around a work product. Thus, the terms outer perimeter, outer perimeter configuration, outer perimeter size, and outer perimeter shape pertain to the distance around, the configuration of, the size of and the shape of the outermost boundary or edge of the work product.

The physical condition of the work product being scanned may include various parameters such as the color, texture, smoothness, composition, firmness, presence of contaminants on or embedded within, presence of foreign objects on or embedded within, uniformity, etc. For work products in the form of food, physical condition may also include softness, or hardness, the presence of rot, the presence of spoilage, such as mold, bruising, discoloration, blemishes. Also concerning food products, scanning may be conducted to determine the presence of undesirable or foreign objects on or embedded within the food products, including fat, bones and cartilage. Other foreign objects of interest or could include metal, plastic, and/or other discontinuities of interest on or in the food product, such as voids or holes.

In addition to the above physical parameters, additional physical parameters that may be ascertained during the scanning of the workpieces includes the color or color variation in a workpiece and the texture of the workpiece. For workpieces in the form of food, these physical parameters may be related to the condition of the food product. For example, the color and texture may be related to whether or not the food product is bruised, or whether the food product exhibits rot or spoilage.

Also, with respect to food products, the scanning thereof can be conducted to ascertain the presence of undesirable attributes, such as bones, cartilage, fat, or voids within the workpiece. In addition, the scanning can be carried out to look for foreign substances within the food products, such as metal, glass, wood, plastic etc.

A further physical parameter related to many of the above specified parameters pertains to the uniformity of the work product, including food products. For example, uniformity in length, width, thickness, texture, color, etc.

The foregoing enumerated size or shape, physical condition, or other physical parameters are not intended to be limiting or inclusive. Other parameters may be ascertained, monitored, measured, etc., by the present system and method. Moreover, the definitions or explanations of the above specific size and/or shape parameters discussed above are not meant to be limiting or inclusive.

System Summary

Figure 1:
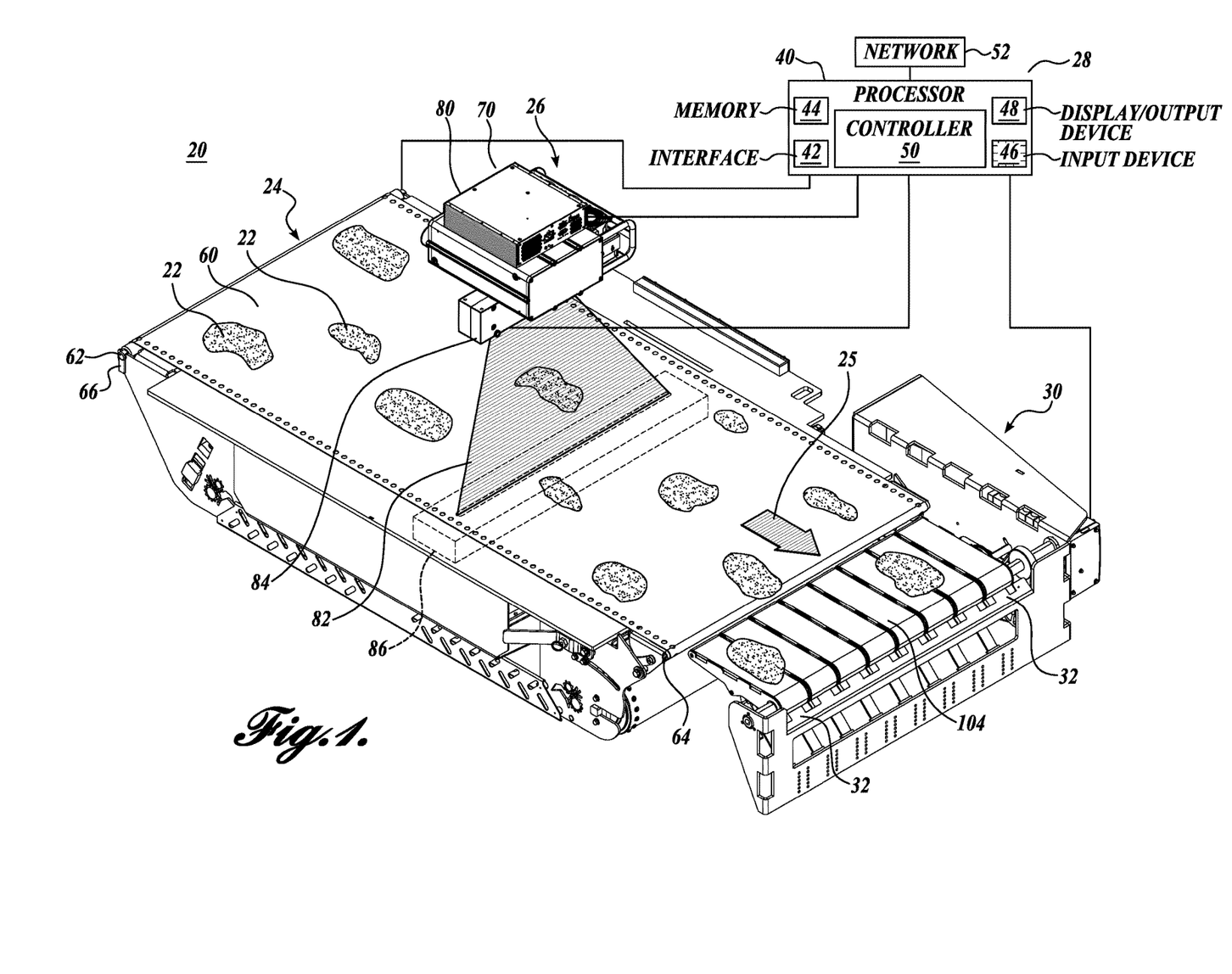
FIG. 1 is a pictorial view of one embodiment of the present disclosure.

FIG. 1 schematically illustrates a system 20 implementing an embodiment of the present disclosure for sorting work products 22. The system 20 includes a moving support surface in the form of a conveyor 24 for conveying the work products 22 along a conveyance or processing path schematically represented by arrow 25. For work products 22 in the form of food, the processing path may include, for example, portioning, trimming, cutting, cooking, baking, frying, cooling, chilling, freezing, or processing the food products in other ways. The conveyor 24 initially carries the work products 22 through a scanning station 26 for scanning the work products and generating data pertaining to various physical parameters/attributes of the work products, as discussed above.

The digital data from the scanning station 26 is forwarded to a processor enabled control system 28 which analyzes the work products 22 for one or more physical parameters or characteristics to determine whether the work product should continue along a travel path 25 for processing, or should instead be removed from the processing path as, for example, a rejected work product for failure to meet one or more established criteria such as one or more physical parameters. If the work product is to be removed from the processing path, the control system 28, from the scanning data, determines the position of the rejected work product across the width of the conveyor as well as along the length of the conveyor. In addition, the control system ascertains the size of the rejected work product, including its width across the conveyor. With this information, the control system controls the operation of a diverter system 30 located in alignment with the conveyor 24.

The diverter system 30 includes a plurality of diverter segments or units 32 that are selectively operable to cause the rejected work products to drop off the end of the conveyor 24 and onto a collection bin, takeaway conveyor, or other container transport device.

Only the diverter segments 32 that are needed to divert the rejected work product 22 are operated, so as to minimize the likelihood that work products other than the rejected work product are diverted from the processing path. The remaining work products are supported by the diverter segments 32 to continue along the processing path.

The width of the diverter segments 32 is selected based on the expected minimum width of the work product. As such, a singular diverter segment can be operated to remove the minimum width work product 22 from the conveyor 24. If the work product is wider than the width of a diverter segment or lies between two diverter segments, two or more of the diverter segments can be operated in unison so that the identified reject work product can be removed from the conveyor 24. In this manner, the likelihood of waste occurring from the diversion of work products that meet the preset parameter or parameters is reduced.

In addition to width of the product, the length and placement of the defect in relationship to the work product is analyzed to precisely time the activation of the segment, including when to start, stop, and how long to open. This is not limited to the complete opening of the segment and can include the amount of degree of opening or position to open.

Processor

Next, describing the foregoing components/aspects of the processing system 20 in more detail, as schematically shown in FIG. 1, the control system 28 includes a processor 40 having an interface 42 for receiving signals and information from conveyor 24, scanning station 26, diverter system 30, and from other data sources of system 20, as described more fully below. A memory unit 44 is provided for storing information regarding the processor 40. A keyboard or other input device 46 is provided to enable an operator to communicate with the processor 40. Also, a display or other output device 48 is provided to convey information from the processor to the operator, including the functioning of the control system 28.

The control system may include a controller unit 50, which may be in the form of a programmable logic controller or other type of controller, for controlling the operation of the sorting system 20, including the conveyor 24, the scanning station 46 and the diverter system 30. The control system 28 can be connected to a network 52. Also, rather than employing a local processor 40, a network computing system can be used for this purpose.

Conveyor

Figure 2:
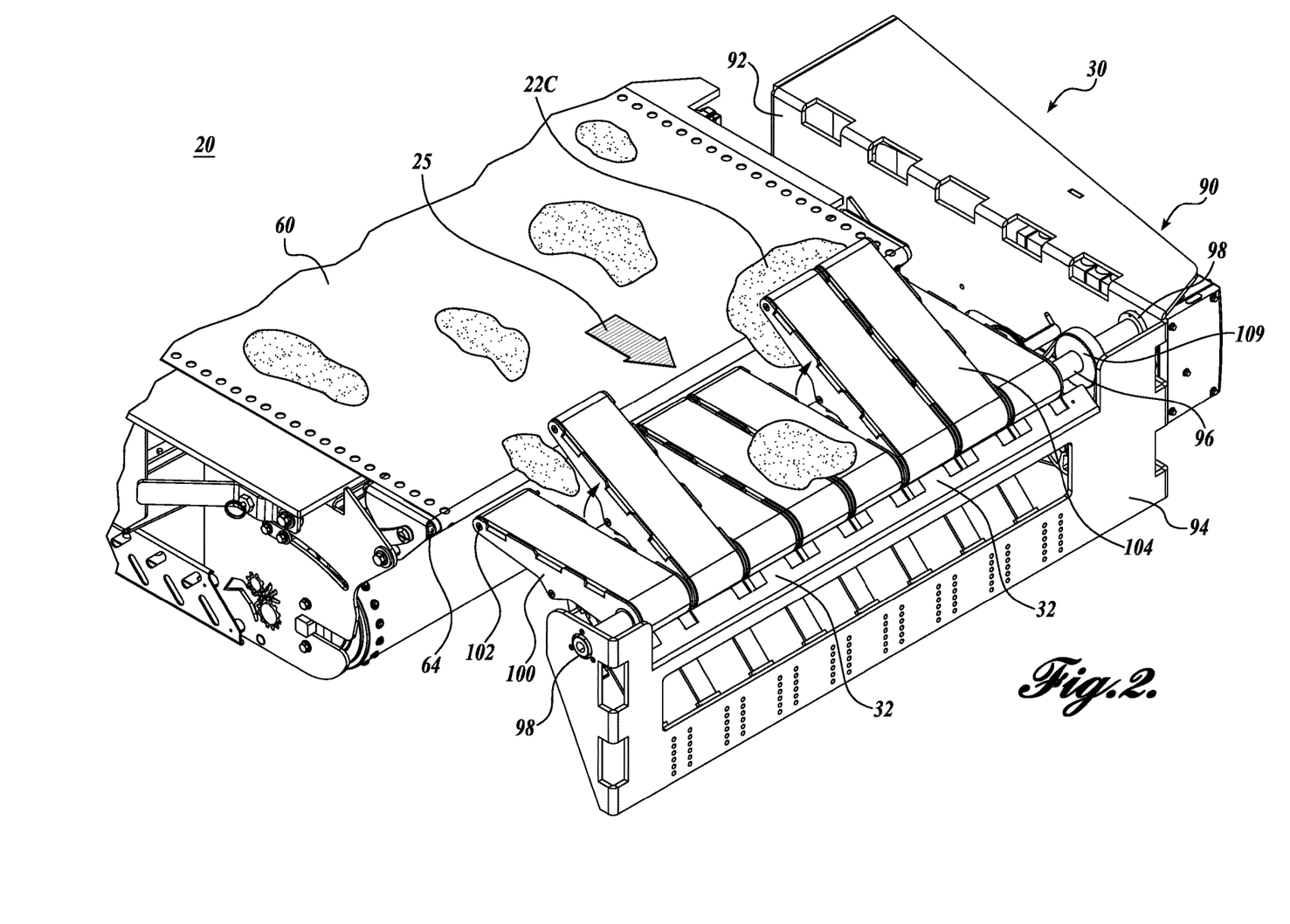
FIG. 2 is a fragmentary pictorial view of FIG. 1 illustrating the actuation of diverter units of the present disclosure.

Referring to FIGS. 1 and 2, conveyor 24, as noted above, includes an endless belt 60 that is trained over end rollers 62 and 64. The endless belt 60 can be powered in a conventional manner. An encoder 66 can be associated with the end roller 62 to monitor the location or position of the belt 60 along the length of the conveyor 24.

If an X-ray scanner, such as scanner 70 shown in FIG. 1, is used, the conveyor belt 60 may be made from material that is permeable to X-rays, such as rubber, plastic, or a combination of both. Because of this construction, X-rays easily pass through the conveyor belt 60 to impinge upon a detector 86 located beneath the upper run of the conveyor belt. One or more idler, drive or other type of roller(s) can be located beneath the upper run of belt 60 to provide clearance for X-ray detector 86.

If an optical scanner is used, the conveyor belt can be of the same construction and type as a belt that is suitable for use with X-ray scanning. However, the belt may also be of metallic construction, including an open weave construction commonly used when cutting or portioning work products, including food products with high speed water jet. Such conveyor belts are articles of commerce.

The system 20 is not limited to the use of conveyor 24 for moving the work products 22 either continuously or intermittently. In this regard, the conveyor 24 can be replaced with moving platforms for carrying the work products or other conveyance mechanisms.

Scanners

Various types of scanners can be utilized at scanning station 26, to ascertain the physical parameters of the work products as described above, including, for example, optical scanners, X-ray scanners, ultrasonic scanners, infrared scanners, laser scanners, CT scanners and MRI scanners Optical Scanners An optical scanner can use a video camera to view the work products illuminated by one or more light sources. Light from the light sources is extended across the moving conveyor belt 60 to define a sharp shadow or light stripe line, with the area forwardly of the transverse beam being dark. When no work product 22 is being carried by the conveyor belt 60, the shadow of the light stripe forms a straight line across the conveyor belt. However, when the work product 22 passes across the shadow line/light stripe, the upper, irregular surface of the work product produces an irregular shadow line/light stripe as viewed by the video camera angled downwardly on the work product and the shadow light/light stripe. The video camera directs the displacement of the shadow line/light stripe from the position it would occupy if no work product were present on the conveyor belt 60. This displacement represents the thickness of the work product along the shadow line/light stripe. The length of the work product is determined by the distance of the belt 60 travels that the shadow line/light stripes are created by the work product. In this regard, the encoder 66, which is integrated into the conveyor 24, generates pulses at fixed distance intervals corresponding to the forward movement of the conveyor belt 60.

X-Ray Scanning

At scanning station 26, an X-ray scanning system 70 can be used to inspect and analyze the work products 22 to determine the physical parameters of the work products, for example, the location, size, shape, and condition of the work products. The X-ray system 70 is schematically shown in FIGS. 1 and 2.

Generally, X-rays are attenuated as they pass through an object in proportion to the total mass of the material through which the X-rays pass. The intensity of the X-rays received at an X-ray detector, after they have passed through an object, such as a work product, is therefore inversely proportional to the density of the object. For example, X-rays passing through a bone, which has a relatively higher density than the flesh of a meat work product, will be more attenuated than the X-rays that pass only through the flesh of the meat. Thus, X-rays are suited to determine not only physical parameters of work products, such as length, width, thickness, etc., but also capable of detecting, for example, defects or foreign contaminants in work products, such as metal or glass, lodged in the work product. For food products, X-ray scanning can detect the presence of bones, cartilage, fat or voids, X-ray scanning can also detect undercuts or voids at the bottom of or within a work product which otherwise would not be visible, each of which have a specific density or X-ray modification characteristic. A general description of the nature and use of X-rays in processing primal cuts of meat can be found in U.S. Pat. No. 5,585,603, incorporated herein by reference.

Referring to FIGS. 1 and 2, the X-ray scanning system 70 includes an X-ray source 80 for emitting X-rays 82 toward a conveyor 24. A collimator 84 is used to focus the X-rays from source 80 into a narrow band across the width of the conveyor 24 so as to cover all work products 22 being carried on the conveyor belt 60.

A line array of X-ray detectors 86 is located adjacent and beneath the upper run of conveyor belt 60 for receiving the X-rays 82 that have passed through the work products when work product is within the scope of the X-rays. Each of the X-ray detectors 86 in the array generates a signal corresponding to an intensity of the X-rays impinging on the X-ray detector. The signals generated by the X-ray detector array are transmitted to processor 40. The processor processes these signals to determine the physical parameters of the work products.

The system 20 may include a position sensor in the form of the encoder 66 that generates the signal indicative of the position of the work product along the length of conveyor 24 as the work product is moved on the conveyor with respect to the X-ray station 26. Thus, the position of the work product along the length and width of the conveyor belt 60 can be ascertained by the X-ray system. As noted above, the X-ray system can also provide numerous other information with respect to a work product, including physical parameters pertaining to the size and/or shape of the work product, including for example, the length, width, aspect ratio, thickness, thickness profile, contour, outer contour configuration, perimeter, outer perimeter configuration, outer perimeter size and/or shape, volume, weight, etc. As noted above, the X-ray system can also locate the presence of defects and foreign contaminants, including where on/in the work product such defect(s) and/or contaminant(s) are located.

Other embodiments of X-ray scanner systems may be utilized, which are also capable of detecting the intensity (or attenuation) of the X-rays that have passed through the work product to determine the physical parameters of the work product cut. For example, an alternative embodiment of an X-ray detector system may include a fluoroscope screen and a video camera. When the X-rays 82 impinge on the fluoroscope screen, the screen is activated to produce light flashes in proportion to the attenuation of the impinging X-rays. The light flashes are then recorded by the video camera, or other device capable of capturing the "picture" produced by the fluoroscope screen. The image captured by the video camera is then transmitted to processor 40 and converted into digital values related to the intensity of the light generated by the fluoroscope screen.

Further alternatively, direct flat panel X-ray imaging technology or direct radiography may be used. For example, an array of amorphous selenium detectors may be used as an X-ray detector to directly detect the intensity of the impinging X-rays, and to transmit the intensity to the processor 40.

Other X-ray system options include the use of a dual-energy X-ray source or a photon-counting, multi-bin X-ray system.

Diverter Systems

Pivoting Diverter

FIGS. 1-4 depict a diverter system 30 composed of individual diverter segments or units 32 that are mounted on a frame structure 90 having a longitudinal bracket 92 mountable on the conveyor 24 and a transverse bracket 94 extending across the conveyor 24 at the downstream end of conveyor belt 60. Although the bracket 94 is shown as being cantilevered from the distal end of the bracket 92, the bracket 94 can be mounted by other configurations.

The plurality of diverter segments 32 are positioned to be substantially coplanar with the upper run of conveyor belt 60 and closely positioned to the downstream end of the conveyor belt so as to provide a substantially continuous conveyance surface with the upper run of the conveyor belt 60. The diverter segments 32 are mounted on frame structure 90 to pivot upwardly about an axle 96 extending substantially the length of the bracket 94. Bushings 98 provide an interface between the ends of the axle 96 and the bracket 94.

Figure 3:
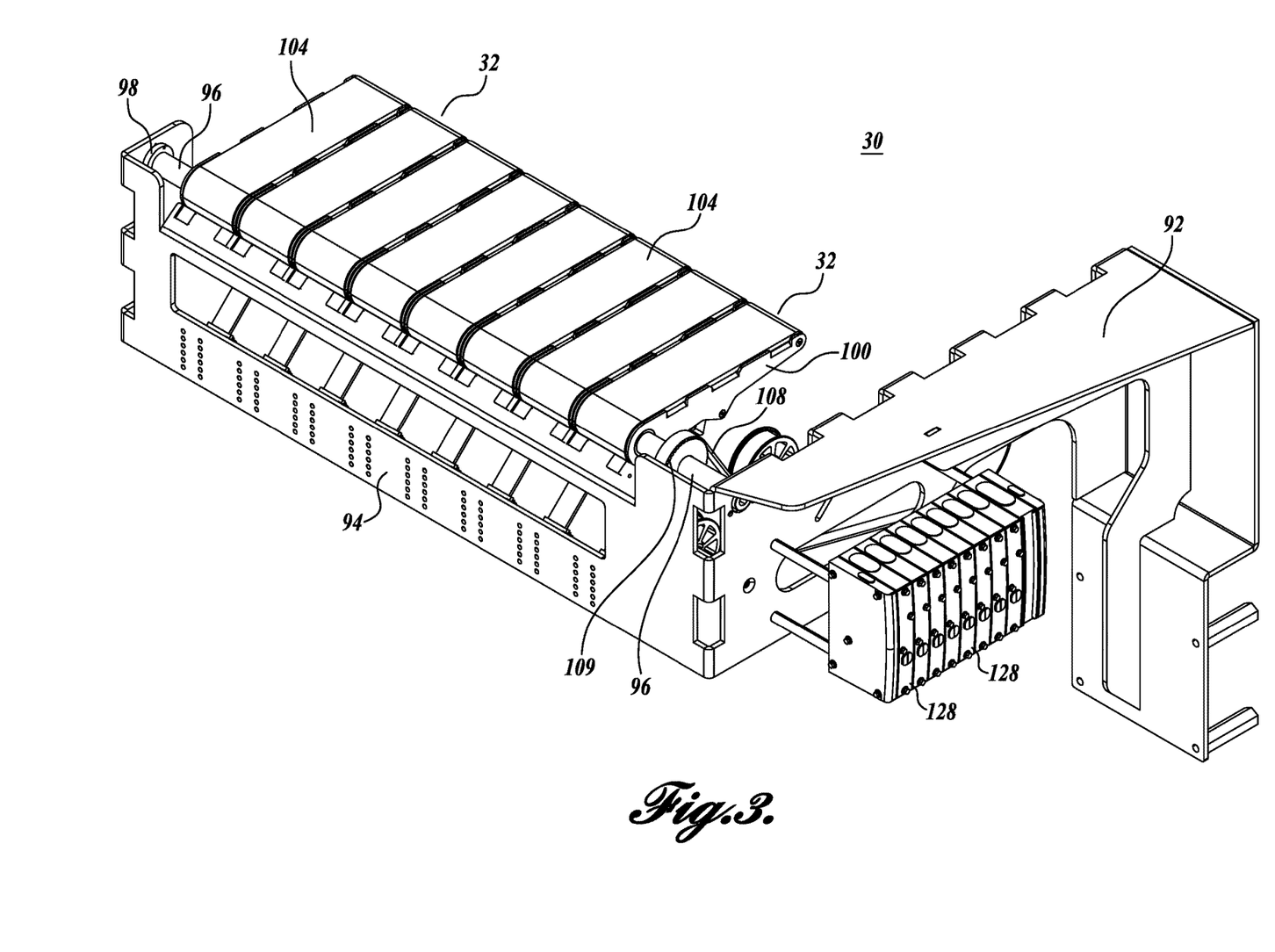
FIG. 3 is a fragmentary pictorial view of the diverter system illustrated in FIGS. 1 and 2, taken from above the diverter system.
Figure 4:
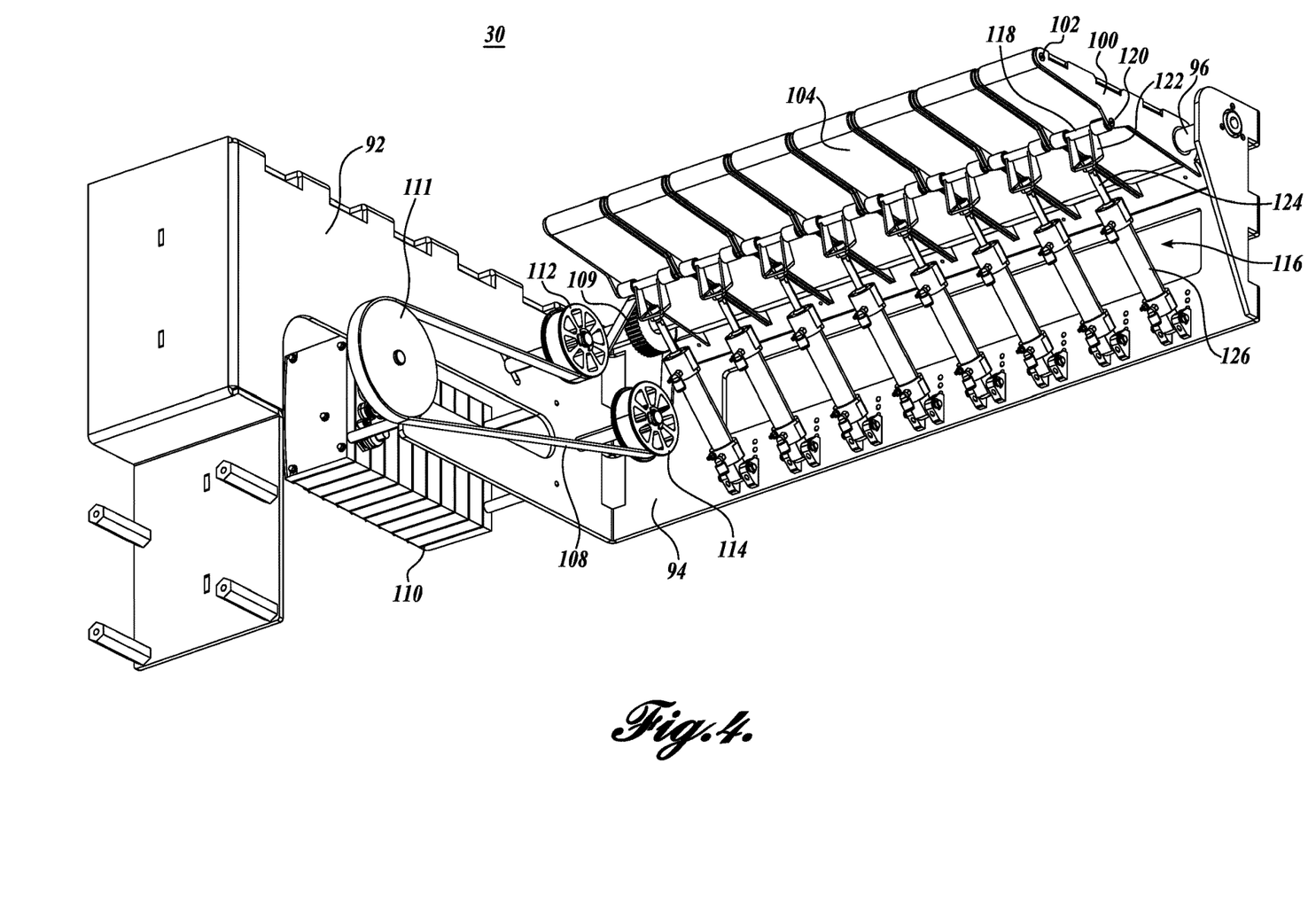
FIG. 4 is a further fragmentary pictorial view of the diverter system of FIG. 3 taken from beneath the diverter system.
Figure 5:
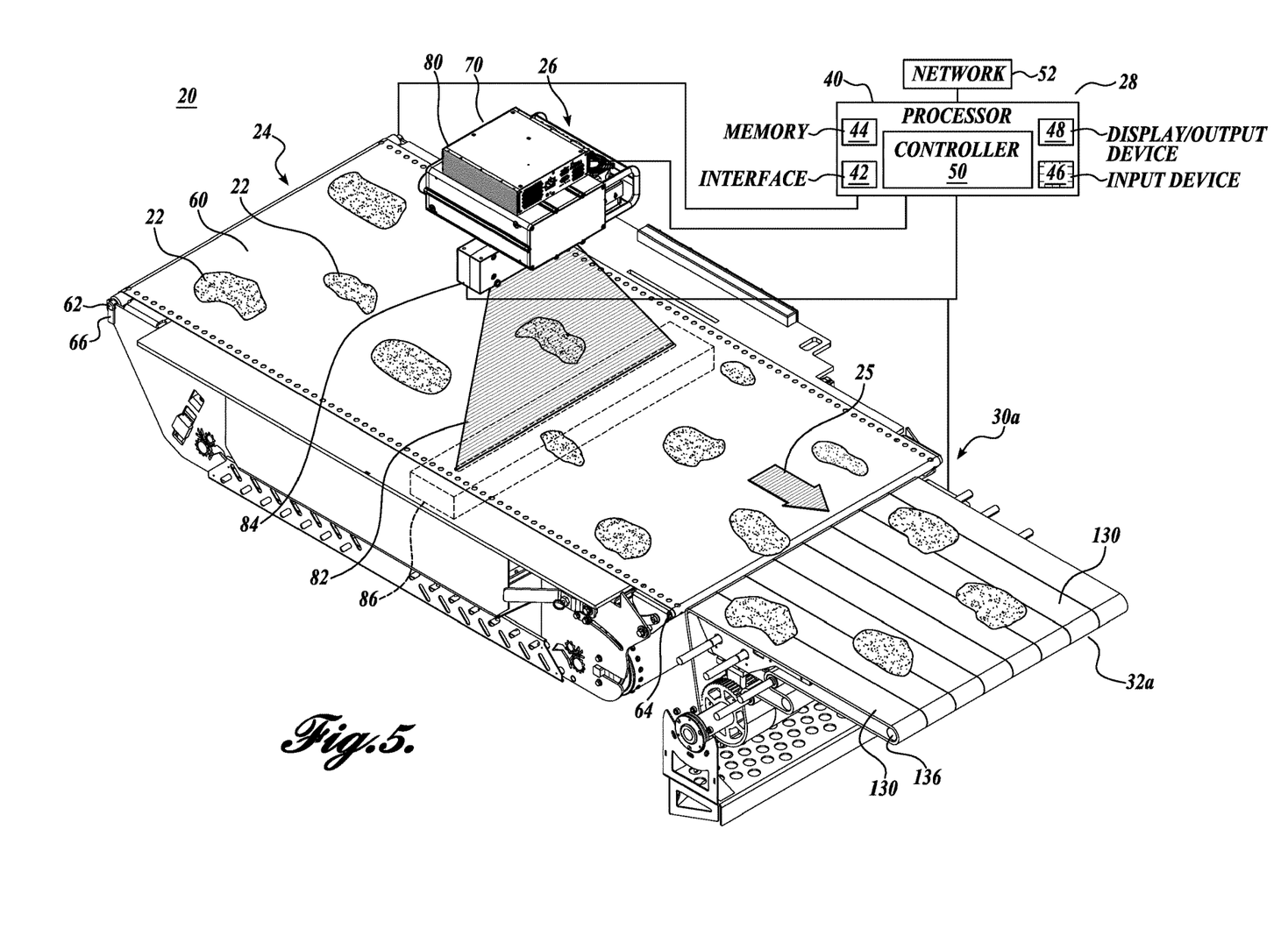
FIG. 5 is a pictorial view of a further embodiment of the present disclosure partially in schematic.

Each of the diverter segments 32 is composed of thin parallel, spaced apart side panels 100 along each side edge of the segments 32. The panels 100 having circular openings at proximal ends to engage over the axle 96. The distal ends of the side panels 100 are attached together by an idler roller 102 pinned to the side panels. An endless belt 104 is trained about the idler roller 102 at the distal end of the diverter segment 32 and a drive collar (not shown) affixed to the axle 96 between the side panels 100 at the proximal end of the diverter segment.

The axle 96 is powered, in one form, by a drive belt 108 that trains around the driven sprocket 109 fixed to the axle 96. The belt 108 is powered by a drive motor 110 that rotates a drive sprocket 111 over which belt is wound. Idler rollers 112 and 114 are used to direct the path of the drive belt 108

The diverter segments 32 are pivotable about axle 96 by linear actuators 116 that span between lower portions of transverse bracket 94 and a cross bar 118 located beneath the endless belts 104 at a location intermediate the ends of the endless belt. To this end, bracket portions 120 extend downwardly from the lower edge of side panels 100 to receive the ends of the cross bar 118. A U-shaped connector yoke 122 extends downwardly from the cross bar 118 for attachment to the distal ends of piston rods 124 that extend and retract from the cylinder portion 126 of the linear actuators 116.

The linear actuators 116 may be linear servo, pneumatic, hydraulic or otherwise operated with a fluid medium. To this end, valves 128 are mounted on longitudinal bracket 92, with one valve for each of the linear actuators 116. As an alternative, the actuators 116 may be electrically or magnetically operated.

As shown in FIGS. 1 and 2, eight diverter segments are positioned at the downstream end of the conveyor 24. However, it is to be understood that the number of diverter segments 32 may be larger in number or smaller in number than shown in FIGS. 1 and 2.

The width of the diverter segments may correspond to the expected smallest width of the work product to be sorted by system 20. Similarly, the width of the diverter segments 32 may be matched to a particular percentile of the expected widths of the work products. For instance, the width of the diverter segments 32 may correspond to the smallest $10^{th}$ percentile of the expected widths of the work products. Of course, a different percentile may be used as a basis for the widths of the diverter segments 32.

The width of the diverter segments 32 is a fraction of the width of the conveyor 24, such fraction selected from the group including, for example, one half; one third; one fourth; one fifth; one sixth; one seventh; one eighth; one ninth; one tenth; one eleventh; one twelfth; one thirteenth; one fourteenth; one fifteenth; one sixteenth; one seventeenth; one eighteenth; one nineteenth; one twentieth; one twenty first; one twenty second; one twenty third; one twenty fourth; and one twenty fifth of the width of the conveyor 24.

As another way to specify the width of the diverters, they can be, for example, from 50% to 4% of the width of the conveyor.

As shown in FIG. 2, if the width of a work product 22c is wider than a singular diverter segment, or if the work product does not align with a singular diverter segment, but overlaps between two diverter segments, then such diverter segments can be operated to match the location of the work product across the width of the conveyor 24.

Also, it may be that the work products 22 are positioned on the conveyor 24 in discrete lanes, for example, two, three, etc., lanes. In this situation, a plurality of diverter segments 32 may be positioned in alignment with each of the lanes. As such, a plurality of diverter segments correspond to each of the lanes. Thus, specific diverter segments 32 aligned with a work product traveling down the lane can be operated if necessary to divert the work product from the conveyor 24. Only the specific diverter segments 32 coinciding with the size and position of the work product within a lane need be actuated. In this manner, there is less likelihood that work product that is to continue along the processing path will be inadvertently diverted, for instance, if a single diverter segment were used for each of the conveyor lanes.

FIGS. 5-9 illustrate another diverter system 30a in accordance with the present disclosure. The diverter system 30a is composed of a plurality of individual diverter segments 32a each composed of an endless belt 130 that is extendable and retractable in length so as to create a gap at the ends of the endless belt(s) 130 distal from the conveyor belt 60, see FIG. 6.

The diverter system 30a includes a mounting frame 132 that is mountable to the conveyor 24. A protective hood 133 extends upwardly from the frame 132 to extend across the diverter segments. The frame 132 also supports and positions the individual diverter segments 32a adjacent the downstream end of the conveyor belt 60. The frame 132 includes a transverse platform portion 134 that spans across the downstream end of the conveyor 24 to mount the diverter segments 32a to be substantially at the same level as the upper run of belt 60.

Figure 8:
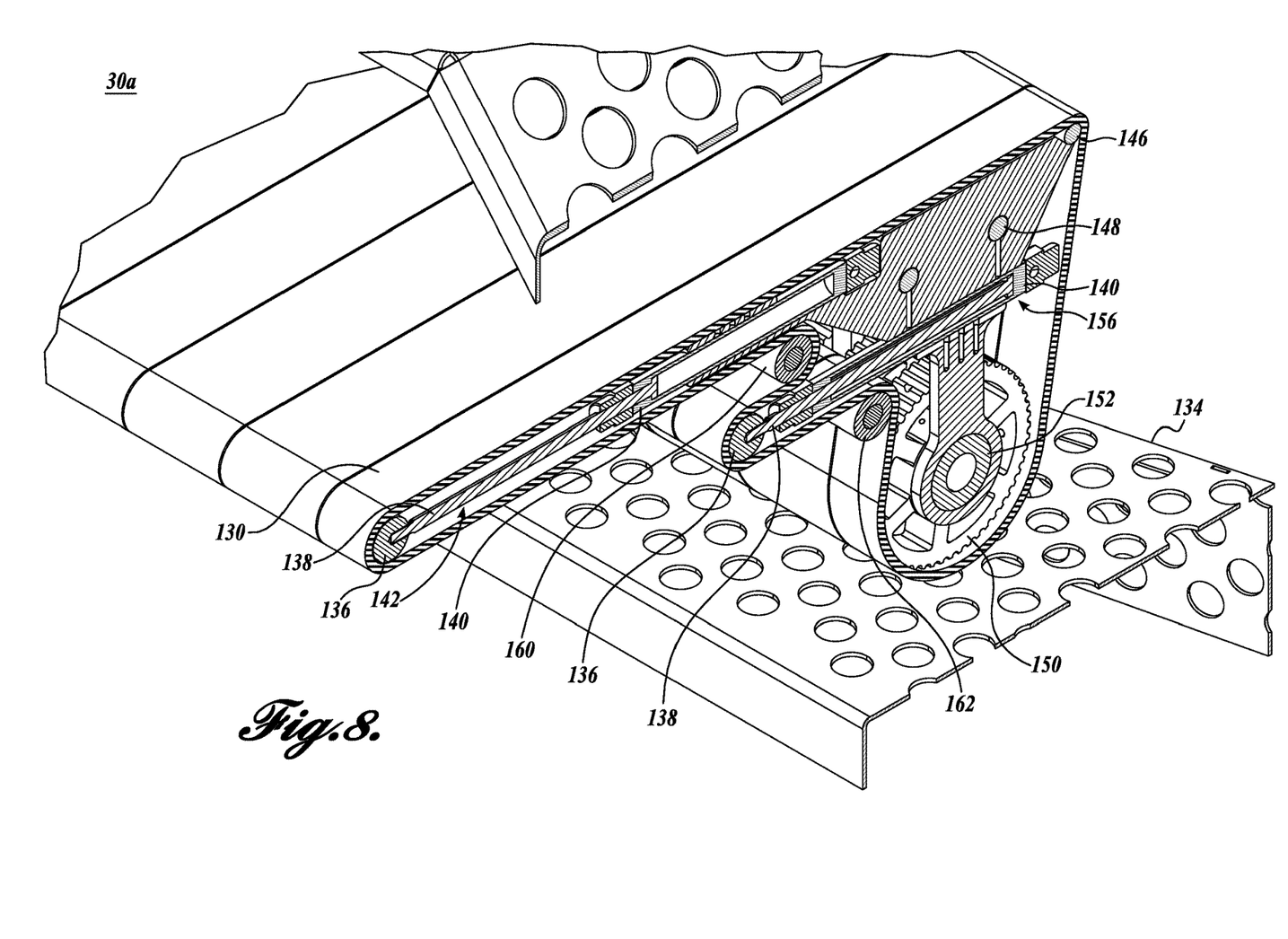
FIG. 8 is an enlarged fragmentary view, partially in cross-section, of the diverter system of FIG. 7.
Figure 9:
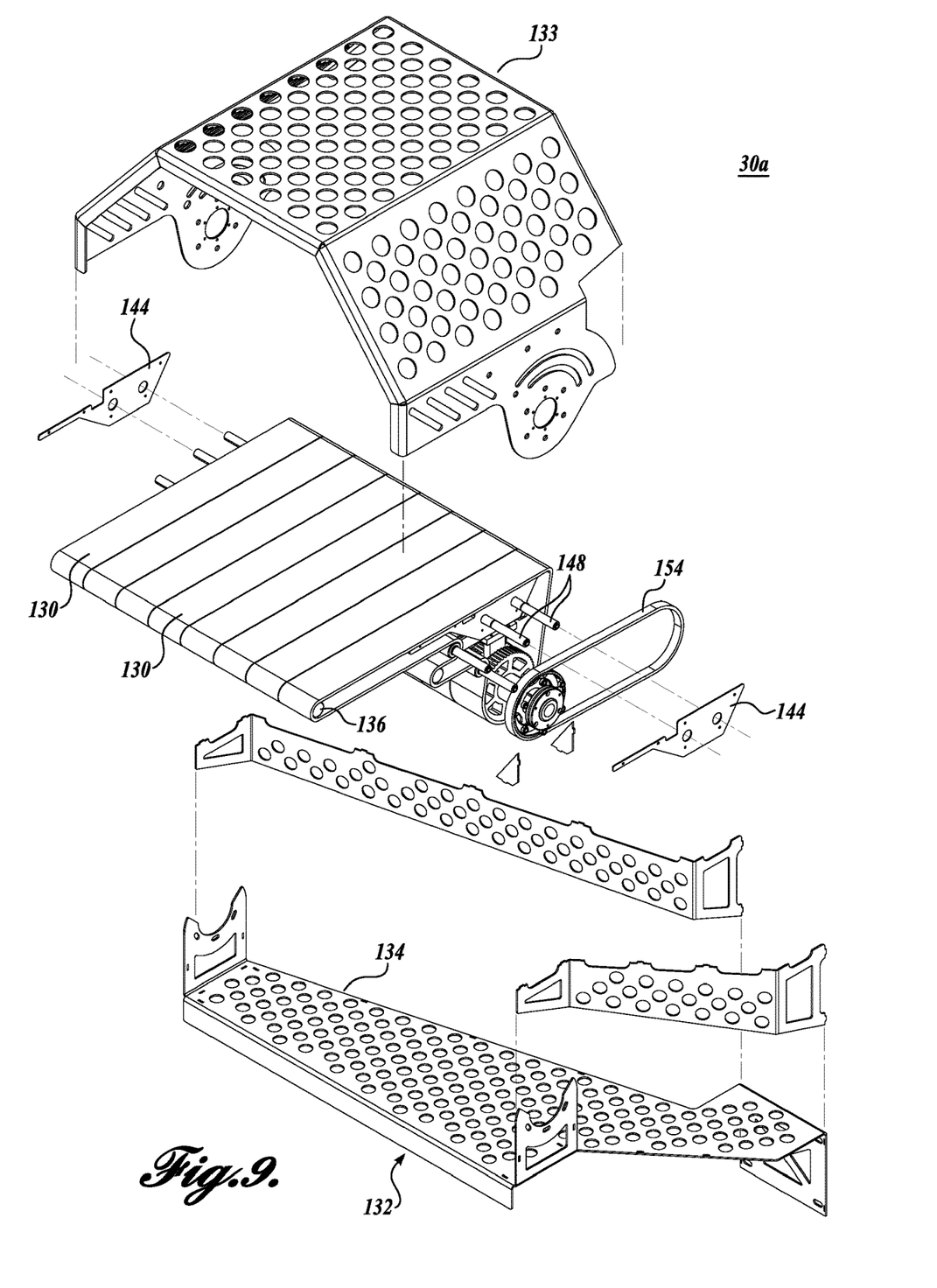
FIG. 9 is an exploded pictorial view of the diverter system shown in FIGS. 7 and 8.

Each of the endless belts 130 of the diverter units 32a trains around a rearward roller 136 that is mounted to the forward end of a piston rod 138 projecting from the barrel or cylinder portion 140 of an actuator 142 that extends rearwardly from the mounting brackets 144. An idler roller 146, about which the endless belt 130 trains, is mounted between mounting brackets 144 that are in spaced parallel relationship along each side of the diverter segments 32a. The brackets 144 are supported in place by a pair of transverse rods 148 spanning across the width of the diverter system 30a.

The endless belt is in the form of a cog belt and is driven by a drive gear 150 axled to the lower portions of the spaced apart mounting brackets 144. The drive gear 150 is powered by a drive axle 152 mounted on frame 132 by upright brackets 153 extending upwardly from the frame which is in turn driven by a drive belt 154 connected to a motive device, which can be in the form of a pneumatic, hydraulic, electrical, etc., drive motor, such as motor 110 shown in FIG. 4. It will be appreciated that all of the endless belts 130 are continually driven in unison by the drive axle 152 and corresponding drive gears 150.

The extension and retraction of the endless belts 130 is accomplished by extension and retraction of upper actuator 142, described above, and a lower actuator 156. The lower actuator 156 is constructed the same as or similarly to the upper actuator 142, including having a cylinder portion 140 and an extendable retractable piston rod portion 138, with a rearward roller 158 mounted on and carried by piston rod 138. An idler roller 160 is positioned at an elevation between the two end rollers 136 of the upper and lower actuators 142 and 156. The idler roller 160 is mounted for rotation with the endless belt 130, but is otherwise stationary with respect to the mounting bracket 144. A second idler roller 162 is positioned between rearward roller 136 and drive gear 150 so that there is sufficient wrap of the belt 130 around the roller 136 and drive gear 150.

Figure 6:
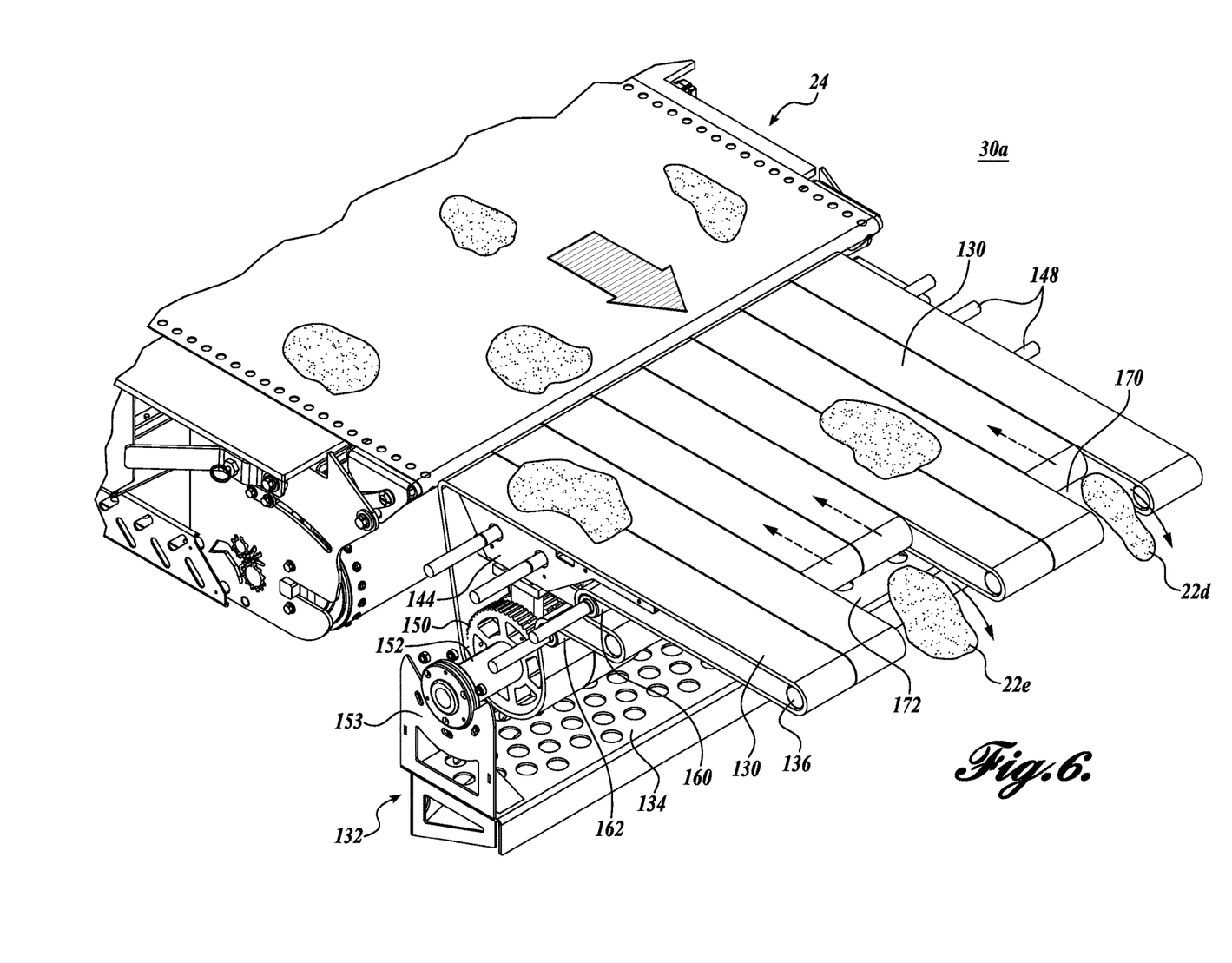
FIG. 6 is a fragmentary pictorial view of a portion of FIG. 5 focusing on the diverter system.
Figure 7:
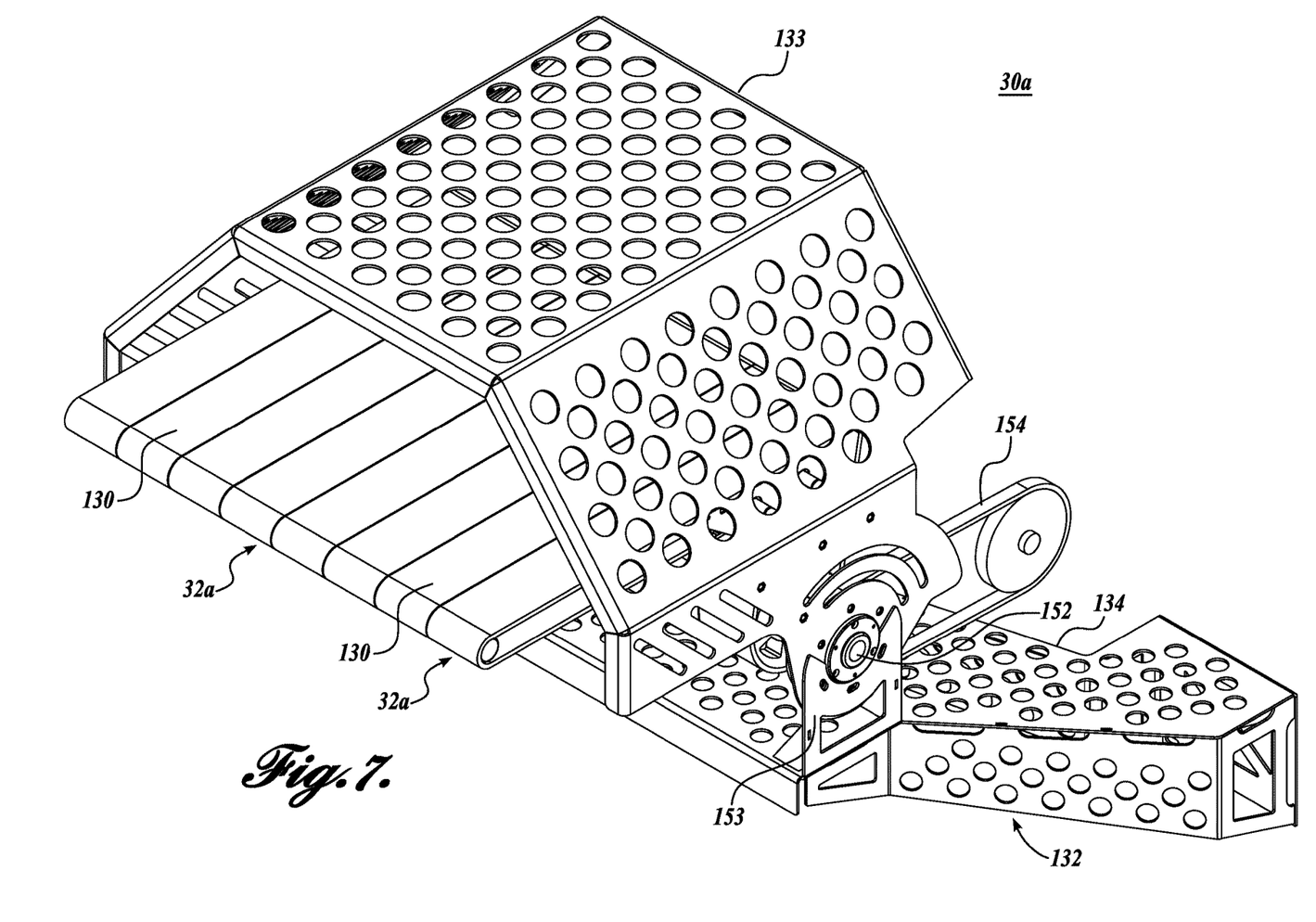
FIG. 7 is a pictorial view of the diverter system of FIGS. 5 and 6 taken from above the diverter system.

The extension and retraction of the upper and lower actuators 142 and 156 is coordinated so that as one actuator extends the other actuator contracts in a corresponding amount. For example, the upper actuators 142 are shown as substantially fully extended in FIG. 5 so that the distal leading ends of the belt 130 are in farthest position downstream of the conveyor belt 60. As shown in FIG. 6, some of the endless belts 130 are retracted so as to form gaps 170 and 172 at the distal end of the diverter system 30a to enable work products 22d and 22e to drop downwardly off of the diverter system. This is accomplished by retracting the upper actuator 142 and simultaneously extending the lower actuator 156 so as to maintain a constant tension or tightness on the endless belts 130.

The discussion with respect to diverter system 30 pertaining to the widths of the endless belts 130 also applies to diverter system 30a, and thus will not be repeated here.

Although two diverter systems 30 and 32a have been described and illustrated, it is to be understood that numerous types of diverter systems can be employed wherein a plurality of diverter segments are arrayed across the downstream end of a conveyor belt 60 and are individually controlled so as to operate to divert only the work products identified for diversion without unintentionally or accidentally diverting other work products that are desired to continue along the processing path within which the sorting system 20 is positioned.

The sorting system of the present disclosure has been described above for use in diverting work products, including food products, that do not meet required physical criteria from continuing on the processing path. It is to be understood that numerous different criteria may be being applied to the work product simultaneously, for example, a minimum width, a maximum length, a minimum weight, a maximum thickness, as well as a specified color range. Work products that do not meet all these criteria can be diverted from the processing path.

In addition, the sorting system of the present application can be used to sort work products according to one or more physical parameters. For example, work products could be sorted according to weight, with those work products in a first weight range being diverted by a diversion system to a particular process path. Of the remaining work products, those in a second weight range can be diverted to a second process path by use of a further diversion system of the type or types described above. The remaining work products can continue on the original process path corresponding to conveyor 24 and diverter system 30. Thus, the system 20 can function as a work product sorter that is capable of accurately sorting work products according to one or more physical parameters with very high throughput.

Figure 10:
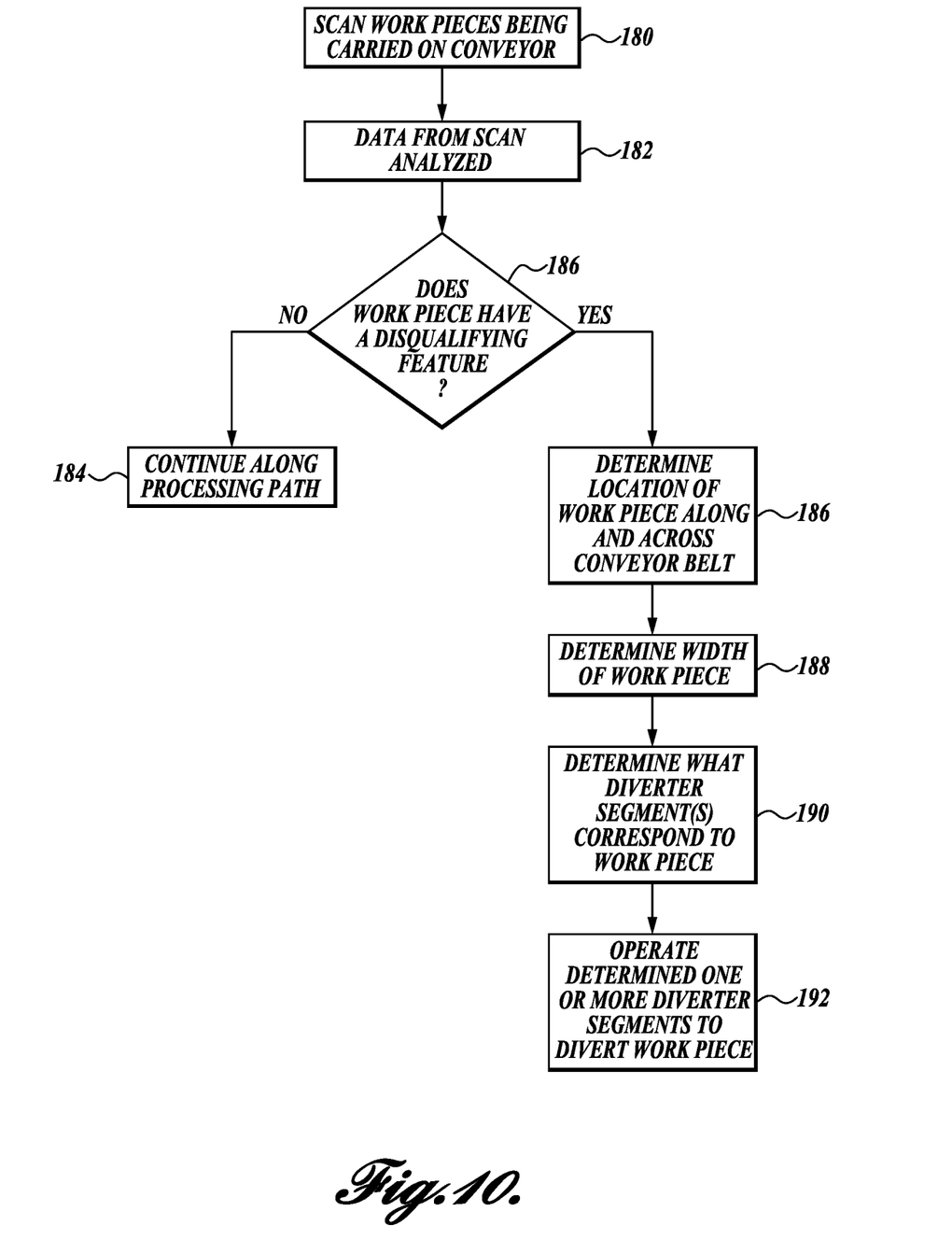
FIG. 10 is a flow diagram illustrating one method of using the diverter system of the present disclosure.

One example of the use of the sorting system 20 is illustrated in the flow diagram of FIG. 10. In this regard, the process or method begins at step 180 wherein workpieces being carried on a conveyor are scanned by a scanner. The workpieces can be randomly placed on the conveyor or can be placed on the conveyor in two or more lanes. The workpieces may be of variable size and shape.

The electronic data from the scanner is transmitted to the processor wherein at step 182 the processor analyzes the data to ascertain one or more desired physical characteristics or parameters of the work products and determines whether such physical characteristics are within a set point that has been predetermined for such physical characteristic(s). If the physical characteristic(s) is/are within the preselected set point, the work product continues along the processing path at step 184.

However, if the work product does not meet the set point range for the one or more designated characteristics and thus has a disqualifying feature, then the work product is to be diverted from the processing path.

In this regard, in step 186, the data from the scanning step 180 is analyzed to determine the location of the workpiece both along the length of the conveyor belt and across the width of the conveyor belt. In addition, in step 188, the width of the workpiece is ascertained, again from the scanning data obtained at step 180.

Next, at step 190, the processor determines what diverter segment corresponds to the workpiece to be diverted from the processing path. Then at step 192, the processor causes the diverter segment(s) to actuate just as the work product is approaching the diverter segment(s) so as to remove the work product from the processing path and then quickly resume their normal position or condition to enable non-diverted work products continue along the processing path. It will be appreciated that the processor can control the timing of the actuation of the diverter units or segments, for example, to correspond to the shape of the work product being diverted. For example, if the work product has a leading edge that is disposed diagonally regarding to the length of the conveyor and spans across two or more diverter units, the actuation of the diverter units can be staggered to match the next time the work product matches the diverters, rather than all of the diverters opening and closing in unison. As such, the possibility of acceptable work products being inadvertently diverted is reduced.

The sorting system 20 is capable of continually scanning the work product being carried on the conveyor so that all, or substantially all, of the "disqualified" workpieces are efficiently removed from the processing path. Further, because the diverter segments that actuated to divert a workpiece only constitute a fraction of the width of the conveyor belt, and because the actuation of the diverters is controlled and timed to open and close precisely, when the workpiece arrives at the diverter segment and the diverter segment is only opened to the extent necessary to divert the workpiece, there is a greater likelihood that qualifying workpieces will continue along the processing path and will not be inadvertently diverted from the processing path.

While illustrative embodiments have been illustrated and described, it will be appreciated that various changes can be made therein without departing from the spirit and scope of the invention.

The embodiments of the invention in which an exclusive property or privilege is claimed are defined as follows:

1. A diverter system for diverting work products from a processing path that do not meet one or more desired physical parameters for the work products, the work products being carried on a longitudinal conveyor past a scanning station to generate digital data pertaining to physical parameters of the work product, the diverter system comprising:

a plurality of diverter segments arranged to cross the width of the conveyor, the diverter segments having a width that is a fraction of the width of the conveyor and having a length nominally extending along the conveyer, each diverter segment comprising spaced apart elongated individual side panels, the elongated side panels at one longitudinal end are attached together by an idler roller, an endless belt is trained over a drive roller carried by a drive axle and the idler roller to be supported by the drive roller and by the idler roller located between the elongated side panels to define an upper run that is substantially coplanar with the longitudinal conveyor, the elongated side panels extending exterior of and along the lengths of and adjacent the opposite sides of the upper run of the endless belt, the elongated individual side panels forming the exterior sides of the diverter segments;

the elongated individual side panels of adjacent diverter segments in adjacent side-by-side proximity to each other to enable adjacent diverter segments to cooperatively support work products being carried by the upper runs of the adjacent diverter segments;

an individual linear actuator pivotally connected to the laterally spaced apart elongated side panels extending along opposite sides of the endless belt of each individual diverter segment at a location intermediate the ends of the elongated side panels to retract the individual diverter segment by pivoting one end of the diverter segment either upwardly or downwardly relative to the conveyor, the individual actuator is positioned between the side panels of the diverter segment; and a processor enabled control system for controlling the operation of the diverter system, the control system using data from the scanner station to determine whether work products being carried by the conveyor meet one or more required physical parameters for the work products in order to continue along the processing path or do not meet the required one or more physical parameters for the work products so as to constitute reject work products, the control system ascertains the location and size of the reject work products and operates one or more of the diverter segment actuators corresponding to the location of the reject work products across the width of the conveyor and the size of the reject work products to cause the reject work product to be diverted from the processing path.

2. The system according to claim 1, wherein work products to be diverted from the conveyance path have been determined by the control system to not meet one or more required physical parameters for the work products.

3. The system according to claim 1, wherein the physical parameters of the work products include one or more parameters selected from the group consisting of the work product: size; shape; length; width; aspect ratio (length to width); outer contour; outer perimeter; outer perimeter configuration; outer perimeter size; outer perimeter shape; thickness; flatness; the extent of depressions or concavities; depression/concavity size; depression/concavity depth; texture; smoothness; density; color; composition; firmness; presence of contaminants; presence of foreign objects; uniformity.

4. The system according to claim 1, wherein the work product includes food, which is also scanned for the presence of one or more of: fat; bones; cartilage; discoloration; bruising; blemishes; spoilage; rot.

5. The system according to claim 1, wherein the width of the diverter segments are a fraction of the width of the conveyor, such fraction selected from the group including one half; one third; one fourth; one fifth; one sixth; one seventh; one eighth; one ninth; one tenth; one eleventh; one twelfth; one thirteenth; one fourteenth; one fifteenth; one sixteenth; one seventeenth; one eighteenth; one nineteenth; one twentieth; one twenty first; one twenty second; one twenty third; one twenty fourth; and one twenty fifth of the width of the conveyor.

6. The system according to claim 1, wherein the width of the diverter segments are from 50% to 4% of the width of the conveyor.

7. The system according to claim 1, wherein:
the conveyor defining a conveying surface on which the work products are transported; and
the diverter segments are positioned to receive work products from the conveying surface.

8. The system according to claim 7, wherein the diverter segments are nominally coplanar with or below the conveying surface of the conveyor and are controlled by the control system to move out of the plane of the conveying surface of the conveyor.

9. The system according to claim 1, wherein
the conveyor is divided into individual lanes into which the work products are loaded on the conveyor.

10. The system according to claim 9, wherein the control system:
determines the conveyor lane in which a work product to be diverted is located;
and controls the operation of the diverter segment actuator of such conveyor lane to divert the work products from the conveyor.

11. The system according to claim 1, wherein the width of the diverter segments corresponds to the expected minimum width of the work product to be diverted by the sorting system.

12. The system according to claim 1, wherein the width of the diverter segments corresponds to the narrowest $10^{th}$ percentile of the widths of the work products to be diverted.

13. A system for sorting variable size work products, comprising:
(a) a processor enabled control system for controlling the operation of the sorting system;
(b) a longitudinal conveyor controlled by the control system for transporting variable size work products along a conveyance path, the work products loaded randomly across the width of the conveyor, the conveyor having an output end;
(c) a scanner controlled by the control system for scanning the work products being carried on the conveyor, the scanner generating digital data pertaining to the location, size and other physical parameters of the work product and sending such data to the control system;
(d) a diverter system controlled by the control system, the diverter system comprising an array of diverter segments arranged across the width of the conveyor, the width of each diverter segment being a fraction of the width of the conveyor and each diverter segment having a length nominally extending along the conveyor, each diverter segment comprising spaced apart elongated individual side panels, the side panels at one longitudinal end are attached together by an idler roller, a drive roller carried by a drive axle, an endless belt is trained over the drive roller and the idler roller to be supported by the drive roller and the idler roller between the elongated side panels to define an upper run that is substantially coplanar with the longitudinal conveyor, the elongated side panels extending exterior of and along the lengths of and adjacent the opposite sides of the upper run of the endless belt, the elongated individual side panels forming the exterior sides of the diverter segments, the elongated individual side panels of adjacent diverter segments in adjacent side-by-side proximity to each other to enable adjacent diverter segments to cooperatively support work products being carried by the upper runs of the adjacent diverter segments;
(e) an individual linear actuator pivotally connected to the laterally spaced apart elongated side panels extending along opposite sides of the endless belt of each individual diverter segment at a location intermediate the ends of the elongated side panels to retract the individual diverter segment either by pivoting one end of the diverter segment upwardly or downwardly relative to the conveyor, the individual actuator is positioned between the side panels of the diverter segment; and
(f) wherein the control system based on the data from the scanner determines what work products are to continue along the conveyance path and what work products are to be diverted from the conveyance path, the control system ascertains the location and size of the work products to be diverted from the conveyance path and operates one or more of the diverter actuators corresponding to the location across the width of the conveyor belt of the work product to be diverted and the size of the work product to be diverted, to cause the work product to be diverted from the conveyance path.

* * * * *